HENRY R. ROBBINS.

Railroad-Car Heaters.

Reissued May 28, 1872.

No. 4,922.

Witnesses:

H. C. Arch

C. A. Pettit

Inventor:

Henry R. Robbins.

PER Munn & Co

Attorneys.

UNITED STATES PATENT OFFICE.

HENRY R. ROBBINS, OF BALTIMORE, MARYLAND.

IMPROVEMENT IN RAILROAD-CAR HEATERS.

Specification forming part of Letters Patent No. 114,349, dated May 2, 1871; reissue No. 4,922, dated May 28, 1872.

Specification describing a new and Improved Coupling for Steam-Car Heaters, invented by HENRY R. ROBBINS, of Baltimore, in the county of Baltimore and State of Maryland.

Figure 1:
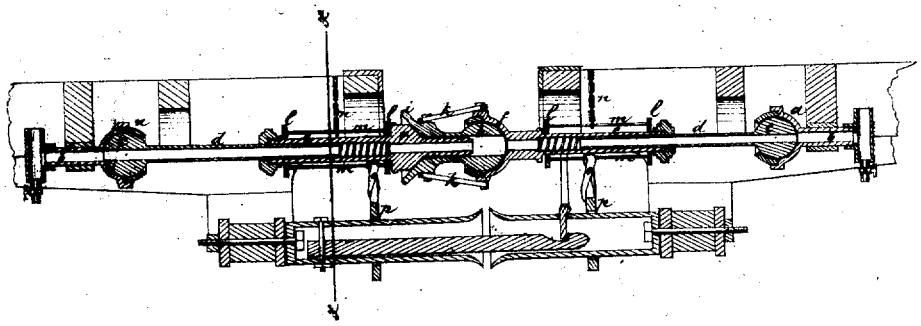
Figure 2:
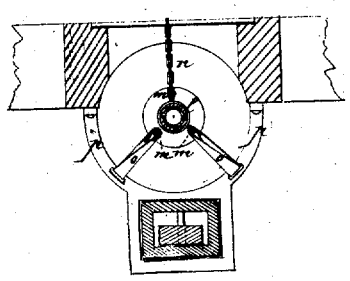

Figure 1 is a longitudinal sectional elevation, and Fig. 2 is a transverse sectional elevation.

This invention has for its object to furnish improved apparatus for connecting the systems of steam-heating pipes with which any two cars may be provided, and for disconnecting the same, said apparatus being also a conductor of the heating element, and being sufficiently flexible to adapt itself to all the sinuosities and inequalities usually found in railways.

Referring to the drawing, and describing first that part of the apparatus which is attached to any one car, *a* is a hollow socket, intended to be placed beneath a car-body, near either end thereof, into one end of which socket a tube, *b*, is fitted, the same being rigidly secured to the car in any suitable manner, and being connected with an elbow coming down from the steam-heater above and delivering steam to the socket, and through it to all the rest of the coupling apparatus. Within the socket *a* a hollow ball, *c*, is placed, having two orifices, one of which communicates with the pipe *b*, and into the other of which a pipe, *d*, is fitted. The pipe *d* extends forward and enters a pipe, *e*, through a gland placed at the end of the latter, so as to make a steam-tight joint. A spiral spring is placed inside the pipe *e* for the purpose of taking up the "slack" that might otherwise occur between the parts, thus accommodating the pipes to the action of the train. At the front end of the pipe *e* is a socket, *f*, which incloses a hollow ball, *h*, from one side of which a bell-mouthed sleeve, *i*, projects. A cylindrical bore extends through both the ball and sleeve, and communicates with the interior of the pipe *e*. The bell-mouthed sleeve terminates that part of the coupling apparatus which is attached to any one car. Pins project in sufficient numbers radially from the exteriors of both the sleeve and socket *f*, to which pins are connected the ends of springs *k*, which tend to keep the bell-mouthed sleeve always in line with the pipes in rear of it and in the proper position to receive the head of the coupling apparatus appertaining to another car. Two rings, *l*, are placed loosely on the outside of the pipe *e*, which rings are connected by parallel bars *m*, to the upper one of which a chain, *n*, is attached, which suspends the pipes to the car and takes their weight off from the central ball. To the side bars *m* are made fast the ends of springs *o*, the other ends of which are fastened to iron stays *p* that extend downward from the car. The springs *o* expand or contract according to the curvature of the road, permitting the pipes to sway from side to side.

The chain *n* should be of such length as to keep the central ball *h* always slightly elevated above the end balls in order to permit the free passage of steam. Waste-ways fitted with cocks should be made through the sockets *a*, by which the water of condensation may escape.

The corresponding part of the coupling apparatus that is attached to another car is like the one above described, with this exception, that its pipe *e*, instead of terminating in a socket, ends in a hollow spear-head, *r*, the cylindrical portion *s* of which is made of the proper size to enter and fit closely the bore of the sleeve *i*, while its incline sides *x* are made to correspond in shape with the bell-mouth of said sleeve, thereby forming a steam-tight joint between the spear-head and bell-mouthed sleeve when they are brought together. When thus connected the two parts of the coupling apparatus afford a continuous passage for the steam, hot air, hot water, or whatever heating element may be employed, this mechanism being as well adapted to one as another.

The coupling, considered as a whole, is steam-tight and sufficiently flexible for all ordinary purposes. Its component parts are held together by the car-coupling shown. Any car-coupling, however, may be used that will answer the purpose, though the one here figured is that which I prefer.

To supply the heating material a boiler may be placed in the front car, or the steam may be taken direct from the locomotive-boiler.

I am aware that various devices have been invented for this purpose, some of which have employed ball-and-socket joints in certain ways. Others have used sleeve-pipe joints with springs; and others again have employed a bell-mouth socket for coupling; but I do not claim any one of these special devices as my invention.

Having thus described my invention, what

I do claim as new, and desire to secure by Letters Patent, is—

1. The combination of three ball-and-socket joints with sleeve-pipe joints regulated by helical or other suitable springs, and with a bell-mouthed and spear-head coupling of automatic action, in the manner shown and described, for the purpose of securing a flexible, durable, and elastic steam-tight conduit, with an automatic coupling for the passage of steam between railroad cars or other structures which are variable in their positions.

2. The arrangement of the springs *k k* on the pins projecting from the bell-mouthed sleeve *i* and socket *f*, as and for the purpose specified.

3. The arrangement of parts for supporting the steam coupling or pipes, consisting of the device *l l m m*, the springs *o o* attached to the curved stays *p p* of the draught-coupling, and the chains *n*, all as herein shown and described.

4. The arrangement of the pipe *e*, rings *l*, and bars *m*, as set forth.

5. The hollow spear-head, in combination with the bell-mouth sleeve and the ball-and-socket joint immediately connected therewith, as and for the purpose described.

6. The spear-head, in combination with an elastic telescopic pipe and a ball-and-socket joint connected therewith, substantially as described.

7. The bell-mouth sleeve with its ball-and-socket joint, in combination with the elastic extensible pipe and a second ball-and-socket joint, substantially as described.

HENRY R. ROBBIN.

Witnesses:
W. H. HAYWOOD,
ROBT. GILMORE.